United States Patent

Watanabe

[11] Patent Number: 5,920,544
[45] Date of Patent: *Jul. 6, 1999

[54] METHOD AND DEVICE FOR SELECTING EXCHANGE LINE

[75] Inventor: Yoshihiro Watanabe, Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/607,195

[22] Filed: Feb. 26, 1996

Related U.S. Application Data

[63] Continuation of application No. 08/298,066, Aug. 30, 1994, abandoned.

[30] Foreign Application Priority Data

Feb. 25, 1994 [JP] Japan .................................... 6-028213

[51] Int. Cl.$^6$ ........................................................ H04J 3/22
[52] U.S. Cl. .......................................... 370/232; 370/395
[58] Field of Search .............................. 370/17, 60, 60.1, 370/94.1, 94.2, 54, 85.7, 230, 229, 232, 233, 234, 395, 235, 389, 410, 522, 432; 364/550

[56] References Cited

U.S. PATENT DOCUMENTS

| | | | |
|---|---|---|---|
| 4,984,264 | 1/1991 | Katsube | 370/17 |
| 5,038,340 | 8/1991 | Ochiai | 370/17 |
| 5,040,171 | 8/1991 | Osaki | 370/17 |
| 5,119,367 | 6/1992 | Kawakatsu et al. | 370/54 |
| 5,153,877 | 10/1992 | Esaki et al. | 370/94.1 |
| 5,231,631 | 7/1993 | Buhrke et al. | 370/60 |
| 5,231,649 | 7/1993 | Duncanson | 370/112 |
| 5,502,714 | 3/1996 | Sallberg | 370/17 |
| 5,521,971 | 5/1996 | Key et al. | 370/17 |

*Primary Examiner*—Chau Nguyen
*Attorney, Agent, or Firm*—Helfgott & Karas, P.C.

[57] ABSTRACT

The present invention relates to a technique by which a line in a trunk group is selected within an exchange such as an ATM exchange that handles cells with fixed lengths. The object is to obtain a multiple effect in a burst traffic to realize a communication state with good efficiency. The device, that selects a line in a trunk group within an exchange that handles cells with fixed lengths, includes a similarity deciding unit that decides the similarity of a burst characteristic of an input signal, and accommodating line deciding unit for deciding an accommodating line in accordance with a result decided by the similarity deciding unit.

12 Claims, 15 Drawing Sheets

FIG. 7

| CONNECTION REQUEST BURST TYPE | INVADING PRIORITY BURST TYPE | |
|---|---|---|
| | HIGH | LOW |
| a | b→c→d→e→f→g→h→ ··· | →y |
| b | c→d→a→e→f→g→h→ ··· | →y |
| c | d→e→f→b→a→g→h→ ··· | →y |
| | | |
| y | x→v→u→t→s→r→q→ ··· | →a |

| TRUNK GROUP A | BURST ATTRIBUTE | LINE NUMBER OCCUPIED |
|---|---|---|
| | a | LINE:1  LINE:2 |
| | b | LINE:3 |
| | c | LINE:4 |
| | x | LINE:5 |
| | y | UNUSED |

| LINE NUMBER | 1 | 2 | 3 | 4 | 5 | 6 | 7 |
|---|---|---|---|---|---|---|---|
| IN USE / NOT USED | IN USE | IN USE | IN USE | IN USE | IN USE | UNUSED | UNUSED |

TRUNK GROUP A

| TRUNK GROUP A | | |
|---|---|---|
| | BURST ATTRIBUTE | LINE NUMBER OCCUPIED |
| | a | LINE:1, LINE:2 |
| | b | LINE:3 |
| | c | LINE:4 |

| TRUNK GROUP A | | | | | |
|---|---|---|---|---|---|
| | LINE NUMBER | 1 | 2 | 3 | 4 |
| | IN USE / NOT USED | IN USE | IN USE | IN USE | IN USE |

| TRUNK GROUP A | | |
|---|---|---|
| BURST ATTRIBUTE | LINE NUMBER OCCUPIED | |
| a | LINE:1, LINE:2, LINE:3 | |
| b | LINE:3 | |
| c | LINE:4 | |

10

METHOD AND DEVICE FOR SELECTING EXCHANGE LINE

This is a continuation of application Ser. No. 08/298,066, filed Aug. 30, 1994, abandoned.

BACKGROUND OF THE INVENTION

1) Field of the Invention

The present invention relates to a method and device for selecting a line in a trunk group within an exchange such as an ATM (Asynchronous Transfer Mode) exchange which handles cells with fixed data lengths.

2) Description of the Related Art

Recently, ATM exchange technology has been agreed as the next generation exchange system by the CCITT (International Telegraph and Telephone Consultative Committee). The ATM exchange technology has been aggressively studied in many institutions to realize as the broadband ISDNs (Integrated Services Digital Networks).

The ATM exchange is characterized in that user information is interchanged in a form of a packet with a fixed length called a cell including contents of unified information (such as data, audio, image) so that information can be transmitted at high speed.

In ATM exchanges, various burst connections are accommodated in the same exchange. The important point is that a resource allocating method uses effectively line resources to take full advantage of traffic characteristics.

Chiefly, both a load distributing system and a squeezing system have been known as a line selecting algorithm in an ATM exchange.

The load distributing system allocates a requested connection to a line with the largest vacant band to provide the same service quality (regarding cell delay, cell discarding rate, or the like) to all connections.

The squeezing system allocates a requested connection to the least vacant band. This system suppresses the fractional releasing effect that a request for larger band cannot be connected because a vacant band is accumulated little by little as connection between plural lines is equally allocated.

However, the conventional method does not perform a line selection, taking account of burst information of a connection to be connected. Hence there is a disadvantage in that the multiple effect is reduced so that the line use efficiency cannot be improved.

The problem above causes that when connections each having a burst characteristic different from another one are allocated to the same line, it is difficult to establish the multiple effect by which peaks and valleys of a burst traffic are mutually canceled because the span between the peaks does not agree with the span between of the valleys.

SUMMARY OF THE INVENTION

The present invention is made to overcome the problems mentioned above. An object of the present invention is to provide an exchange line selecting method that can realize a communication status with good efficiency by obtaining a multiple effect of a burst traffic.

Another object of the present invention is to provide an exchange line selecting device that can realize a communication status with good efficiency by obtaining a multiple effect of a burst traffic.

In order to achieve the above objects, according to the present invention, the exchange line selecting method is characterized by the steps of deciding the or determining a similarity of a burst characteristic of an input signal when a line in a trunk group is selected, the trunk line being within an exchange that handles cells with fixed lengths; and deciding or determining an accommodating line according to a result of determining said similarity.

An exchange line selecting method according to the present invention is further characterized by the steps of contrasting or comparing user report burst information of the input signal with setting burst information that is preset according to office data of each line, the setting burst information relating to a connection to be accommodated in a line; extracting a line on which the burst information agrees with the user report burst information; and performing an accepting and determining operation with the extracted line.

Furthermore, an exchange line selecting method according to the present invention is further characterized by the step of performing an accepting and deciding operation using a line with less vacant band among plural extracted lines when the plural lines are extracted.

An exchange line selecting method according to the present invention is further characterized by the steps of extracting a line among other lines, the line being reserved as a line with setting burst information resembling that of the extracted line, when a vacant region of the extracted line is not sufficient to accept a requested connection; and performing an accepting and determining operation using the extracted line.

An exchange line selecting method according to the present invention is further characterized by the steps of extracting a line among other lines, the lines being reserved each as a line with setting burst information resembling that of the extracted line, when a vacant region of the extracted line is not sufficient to accept a requested connection; and performing an accepting and determining operation using a line with much vacant bands among plural extracted lines.

An exchange line selecting method according to the present invention is further characterized by the steps of contrasting user report burst information of the input signal with setting burst information of a connection already accepted in a line; extracting a line in which the burst information agrees with the user report burst information; extracting a line with the largest vacant band among other lines if the extracting step is not performed; and performing an accepting and determining operation with the extracted line.

Moreover, an exchange line selecting device wherein a line in a trunk group is selected within an exchange that handles cells with fixed lengths, is characterized by similarity determining means for determining the similarity of a burst characteristic of an input signal; and accommodating line determining means for determining an accommodating line in accordance with a result determined by the similarity determining means.

In an exchange line selecting device according to the present invention, the similarity determining means includes setting burst information memory means for storing setting burst information of a connection to be accommodated into a line that is preset in office data for each line, and contrasting means for contrasting setting burst information stored in said setting burst information memory means with user report burst information of an input signal; and the accommodating line determining means includes accepting and determining means for extracting a line in which the setting burst information agrees with the user report burst information in accordance with a result contrasted by the contrasting means and for performing an accepting and determining operation using the extracted line.

In an exchange line selecting device according to the present invention, the accommodating line determining means includes accepting and determining means for performing an accepting and determining operation using a line with less vacant band among plural extracted lines when the plural lines are extracted.

In an exchange line selecting device according to the present invention, the accommodating line determining means includes accepting and determining means for extracting a line from other lines, the line being reserved as a line with setting burst information most resembling that of the extracted line, based on a result determined by the similarity determining means, when the vacant region of the extracted line is not sufficient to accept a requested connection and for performing an accepting and determining operation using the extracted line.

In an exchange line selecting device according to the present invention, the accommodating line determining means includes accepting and determining means for extracting lines from other lines, the lines being reserved each as a line with setting burst information resembling that of the extracted line, based on a result decided by the similarity determining means, when the vacant region of the extracted line is not enough to accept a requested connection and for performing an accepting and determining operation using a line with most vacant band among plural extracted lines.

In an exchange line selecting device according to the present invention, the similarity deciding means includes setting burst information memory means for storing setting burst information of a connection already accepted in a line, and comparing means for comparing the setting burst information of a connection already accepted in the line sent from the setting burst information memory means with user report burst information of an input signal; and the accommodating line determining means includes accepting and determining means for extracting a line in which the setting burst information agrees with the user report burst information in accordance with a result contrasted by the contrasting means, for extracting a line with the largest vacant band among other lines if the extracting step is not performed, and for performing an accepting and determining operation using the extracted line.

According to the exchange line selecting method of the present invention, when a line in a trunk group is selected, the trunk line being within an exchange that handles cells with fixed lengths, the similarity in a burst characteristic of an input signal is selected to decide an accommodating line. Hence, there is an advantage in that a multiple effect of a burst traffic is obtained to realize a communication status with good efficiency.

According to an exchange line selecting method of the present invention, user report burst information of the input signal is contrasted with setting burst information that is preset on office data of each line, the setting burst information relating to a connection to be accommodated in a line; a line on which the burst information agrees with the user report burst information is extracted; and an accepting and determining operation with the extracted line is performed. In this case, there is an advantage in that a multiple effect of a burst traffic is obtained to realize a communication status with good efficiency.

Furthermore, according to an exchange line selecting method of the present invention, an accepting and determining operation is performed using a line with less vacant band among plural extracted lines when the plural lines are extracted. Hence, there is an advantage in that a multiple effect of a burst traffic is obtained to realize a communication status with good efficiency. Moreover, an acceptance refusal status can be avoided.

According to an exchange line selecting method of the present invention, a line among other lines, the line being reserved as a line with setting burst information resembling that of the extracted line, are extracted when a vacant region of the extracted line is not enough to accept a requested connection, and an accepting and determining operation is performed using the extracted line. In the same manner as those described above, there is an advantage in that a multiple effect of a burst traffic is obtained to realize a communication status with good efficiency. Moreover, an acceptance refusal status can be avoided.

According to an exchange line selecting method of the present invention, lines among other lines, the lines being reserved each as a line with setting burst information resembling that of the extracted line, are extracted when a vacant region of the extracted line is not enough to accept a requested connection, and an accepting and determining operation is performed using a line with much vacant bands among plural extracted lines. Hence, there is an advantage in that a multiple effect of a burst traffic is obtained. An acceptance refusal status can be avoided while a communication status with good efficiency is realized.

According to an exchange line selecting method of the present invention, user report burst information of the input signal is contrasted with setting burst information of a connection already accepted in a line; extracting a line in which the burst information agrees with the user report burst information; a line with the largest vacant band is extracted among other lines if the extracting step is not performed; and an accepting and determining operation is performed with the extracted line. Hence, there is an advantage in that a multiple effect of a burst traffic can be obtained without presetting a burst type. Thus, an acceptance refusal status can be avoided while a communication status is realized with good efficiency.

Moreover, an exchange line selecting device, wherein a line in a trunk group is selected within an exchange that handles cells with fixed lengths, is composed of a simplified structure including similarity deciding means for deciding the similarity of a burst characteristic of an input signal; and accommodating line determining means for deciding an accommodating line in accordance with a result decided by the similarity determining means. Hence, there is an advantage in that a multiple effect of a burst traffic can be obtained, whereby a communication status with good efficiency can be realized.

In an exchange line selecting device according to the present invention, the similarity determining means includes setting burst information memory means for storing setting burst information of a connection to be accommodated into a line that is preset in office data for each line, and contrasting means for contrasting setting burst information stored in said setting burst information memory means with user report burst information of an input signal; and the accommodating line determining means includes accepting and deciding means for extracting a line in which the setting burst information agrees with the user report burst information in accordance with a result contrasted by the contrasting means and for performing an accepting and deciding operation using the extracted line. In this case, a multiple effect of a burst traffic can be obtained. Hence, there is an advantage in that a good communication with good efficiency can be realized.

Furthermore, in an exchange line selecting device according to the present invention, the accommodating line determining means includes accepting and deciding means for performing an accepting and deciding operation using a line with less vacant band among plural extracted lines when the plural lines are extracted. Hence, a multiple effect of a burst traffic can be obtained. There is an advantage in that an acceptance refusal status can be avoided with a communication status with good efficiency maintained.

In an exchange line selecting device according to the present invention, the accommodating line deciding means includes accepting and determining means for extracting a line from other lines, the line being reserved as a line with setting burst information most resembling that of the extracted line, based on a result decided by the similarity determining means, when the vacant region of the extracted line is not enough to accept a requested connection and for performing an accepting and deciding operation using the extracted line. Hence, a multiple effect of a burst traffic can be obtained. There is an advantage in that an acceptance refusal status can be avoided with a communication status with good efficiency maintained.

Furthermore, in an exchange line selecting device according to the present invention, the accommodating determining means includes accepting and deciding means for extracting lines from other lines, the lines being reserved each as a line with setting burst information most resembling that of the extracted line, based on a result decided by the similarity deciding means, when the vacant region of the extracted line is not enough to accept a requested connection and for performing an accepting and determining operation using a line with most vacant band among plural extracted lines. Hence, as the foregoing manners, a multiple effect of a burst traffic can be obtained. There is an advantage in that an acceptance refusal status can be avoided with a communication status with good efficiency maintained.

In an exchange line selecting device according to the present invention, the similarity determining means includes setting burst information memory means for storing setting burst information of a connection already accepted in a line, and contrasting means for contrasting the setting burst information of a connection already accepted in the line sent from the setting burst information memory means with user report burst information of an input signal; and the accommodating line determining means includes accepting and deciding means for extracting a line in which the setting burst information agrees with the user report burst information in accordance with a result contrasted by the contrasting means, for extracting a line with the largest vacant band among other lines if the extracting step is not performed, and for performing an accepting and deciding operation using the extracted line. Hence, a multiple effect of a burst traffic can be obtained without presetting a burst type. There is an advantage in that an acceptance refusal status can be avoided while a communication status with good efficiency is realized.

BRIEF DESCRIPTION OF THE DRAWINGS

FIG. 7 is a diagram showing an example of burst setting information;

FIG. 12 is a diagram showing an example of burst setting information;

FIG. 13 is a diagram for explaining an example of management data;

FIG. 14 is a diagram showing an example of burst setting information;

FIG. 15 is a diagram showing an example of management data; and

FIG. 16 is a diagram showing an example of burst setting information.

Figure 1:
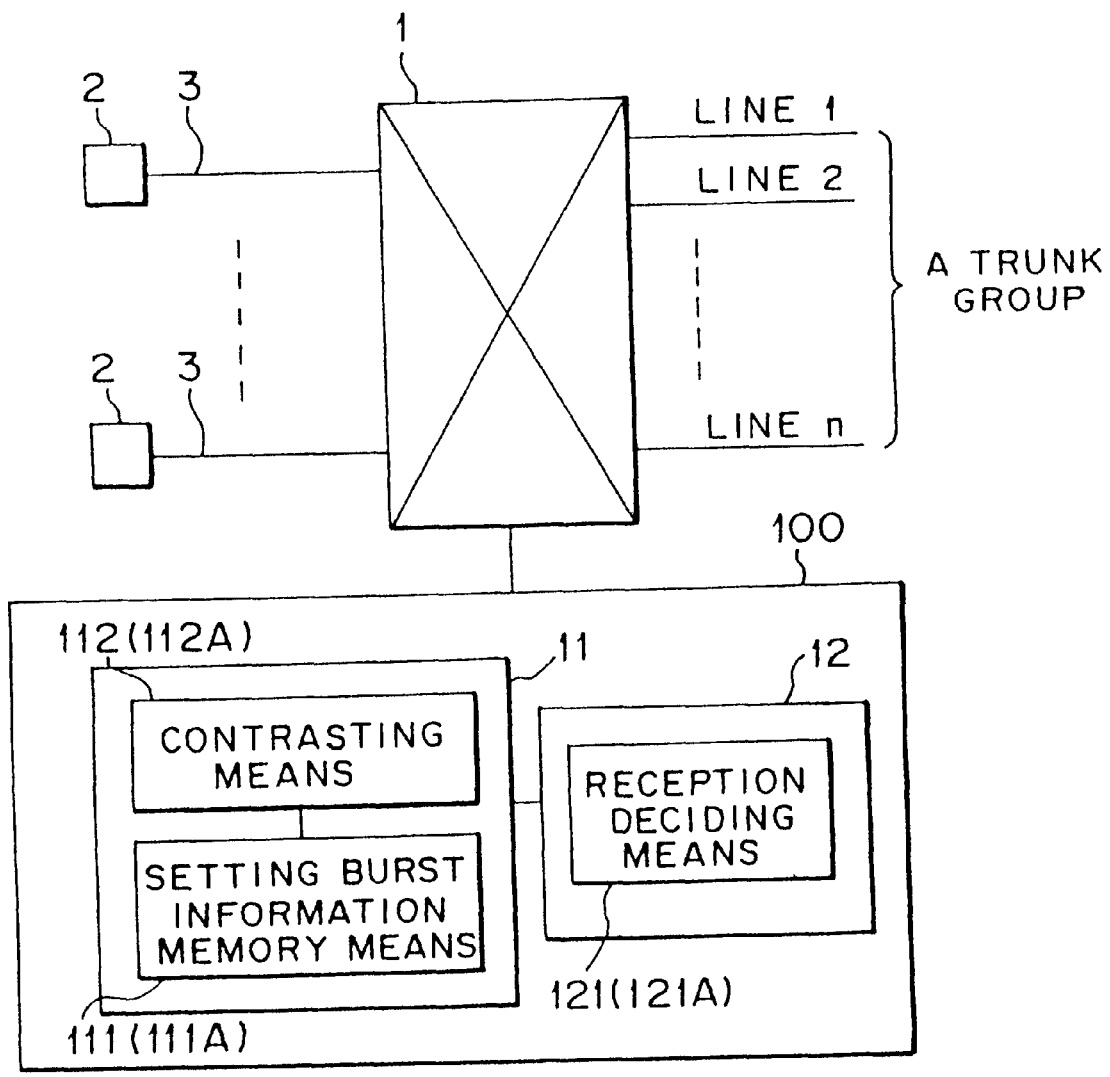
FIG. 1 is a diagram for explaining an aspect of the present invention.

DESCRIPTION OF THE PREFERRED EMBODIMENTS (a) The aspect of the invention:

FIG. 1 is a block diagram showing an aspect of the present invention. Referring to FIG. 1, numeral 1 represents an exchange that handles cells with fixed lengths, 2 represents a terminal, and 3 represents a subscriber's line. Numeral 100 represents a control device. The control device 100 includes a device that embodies the exchange line selecting method according to the present invention.

Now, let us explain the exchange line selecting method according to the present invention.

The exchange line selecting method of the present invention includes a procedure of deciding the similarity of a burst characteristic of an input signal when a line is selected in a trunk group within an exchange 1 that handles cells with fixed lengths, and a procedure of deciding an accommodating line based on a result decided in the former procedure.

According to the procedure, the similarity of a burst characteristic of an input signal is decided to select an accommodating line when a line is selected in a trunk group in an exchange 1 that handles cells with fixed lengths.

As described above, the similarity of a burst characteristic of an input signal is decided to select an accommodating line when a line is selected in a trunk group in an exchange 1 that handles cells with fixed lengths. Hence, there is an advantage in that the burst traffic multiple effect can be obtained so that the communication status can be realized with good efficiency.

In this case, the exchange line selecting method includes a procedure of contrasting user report burst information of the input signal with setting burst information that is preset on office data of each line, the setting burst information relating to a connection to be accommodated in a line; a procedure of extracting a line on which the burst information agrees with the user report burst information; and a procedure of performing an accepting and deciding operation with the extracted line. This approach has an advantage in that the burst traffic multiple effect realizes a communication state with good efficiency.

The procedure may be adopted, in which an accepting and deciding operation is performed using a line with less vacant band among plural extracted lines when said plural lines are extracted. This approach has an advantage in that a burst traffic multiple effect is obtained to realize a communication state with good efficiency while an acceptance refusal state can be avoided.

Moreover, when the vacant region of said extracted line is not enough to accept a requested connection, a line including setting burst information most resembling that of an extracted line is extracted among other lines, and then an accepting and deciding operation is performed using said extracted line. This approach can realize a communication state with good efficiency by obtaining a burst traffic multiple effect while an acceptance refusal state can be avoided.

In this case, when vacant regions of said extracted line is not enough to accept a requested connection, lines including setting burst information most resembling that of an extracted line are extracted among other lines and an accepting and deciding operation is performed using a line with much vacant regions among plural extracted lines. This approach also can realize a communication state with good efficiency by obtaining a burst traffic multiple effect while an acceptance refusal state can be avoided.

Furthermore, the steps may be adopted, of contrasting user report burst information of the input signal with setting burst information of a connection already accepted in a line; extracting a line in which the burst information agrees with the user report burst information; extracting a line with the most vacant regions among other lines if the extracting operation is not performed; and performing an accepting and deciding operation with the extracted line. This approach has an advantage in that an acceptance refusal state can be avoided without presetting a burst type by obtaining a burst traffic multiple effect while a communication state can be realized with good efficiency.

The device for implementing the exchange line selecting method, as shown in FIG. 1, is formed of similarity deciding means 11 for deciding the similarity of a burst characteristic of an input signal, and accommodating line deciding means 12 for deciding an accommodating line in accordance with a result decided by the similarity deciding means 11.

In this case, the similarity deciding means 11 includes setting burst information memory means 111 for storing setting burst information of a connection to be accommodated into a line preset on office data for each line, and contrasting means 112 for contrasting setting burst information stored in the setting burst information memory means 111 with user report burst information of an input signal. The accommodating line deciding means 12 includes accepting and deciding means 121 for extracting a line in which the setting burst information agrees with the user report burst information in accordance with a result contrasted by the contrasting means 112 and for performing an accepting and deciding operation using the extracted line.

Moreover, in this case, the accommodating line deciding means 12 may include accepting and deciding means 121 for performing an accepting and deciding operation using a line with less vacant region among plural extracted lines when the plural lines are extracted.

The accommodating line deciding means 12 includes accepting and deciding means 121 for extracting a line among other lines, the line being reserved as a line with setting burst information most resembling that of an extracted line, based on a result decided by the similarity deciding means 11 when the vacant region of the extracted line is not sufficient to accept a requested connection and for performing an accepting and deciding operation using the extracted line.

Furthermore, the accommodating deciding means 12 includes accepting and deciding means 121 for extracting lines among other lines, the lines being reserved each as a line with setting burst information most resembling that of the extracted line, based on a result decided by the similarity deciding means when the vacant region of the extracted line is not sufficient to accept a requested connection and for performing an accepting and deciding operation using a line with much vacant regions among plural extracted lines.

The similarity deciding means 11 includes burst information memory means 111A for storing burst information of a connection already accepted in a line, and contrasting means 112A for contrasting or comparing said burst information of a connection already accepted in said line sent from said burst information memory means 111A with user report burst information of an input signal. The accommodating line deciding means 12 includes accepting and deciding means 121A for extracting a line in which the setting burst information agrees with the user report burst information in accordance with a result obtained by the contrasting means 112A, for extracting a line with the largest vacant band among other lines if the extracting step is not performed, and for performing an accepting and deciding operation using the extracted line.

In such a configuration, the similarity deciding means 11 determines whether or not a burst characteristic of information of an input signal. The accommodating line deciding means 12 decides an accommodating line in response to a result decided by the similarity deciding means 11.

In this case, when the similarity deciding means 11 executes a deciding operation, the contrasting means 112 contrasts setting burst information stored in the setting burst information memory means 111 with user burst information of an input signal. In the accommodating line deciding means 12, the accepting and deciding means 121 extracts a line based on a result contrasted by the accommodating line deciding means 112, the line in which setting burst information agrees with user report burst information, to perform an accepting and deciding operation using the extracted line.

In this case, when plural lines are extracted, the accommodating line deciding means 12 may perform an accepting and deciding operation using a line with less vacant region among the plural lines.

In the accommodating line deciding means 12, when a vacant region in an extracted line is not enough to accept a requested connection, the accepting and deciding means 121 extracts a line among other lines, the line being reserved each as a line with setting burst information resembling that of the extracted line, based on a result decided by the similarity deciding means 11 to perform an accepting and deciding operation using the extracted line.

In the accommodating line deciding means 12, when a vacant region in an extracted line is not enough to accept a requested connection, the accepting and deciding means 121 extracts a line reserved as a line among other lines, the lines being reserved each as a line with setting burst information resembling that of the extracted line, based on a result decided by the similarity deciding means 11 to perform an accepting and deciding operation using a line with much vacant region among the extracted plural lines.

In the similarity deciding means 11, the contrasting means 112A contrasts burst information of a connection already accepted in a line from the burst information memory means 111A with user report burst information of an input signal. In the accommodating line deciding means 12, the accepting deciding means 121A extracts a line in which burst information agrees with user report burst information from a result contrasted by the contrasting means 112A. If the extracting operation is not performed, a line with the most vacant region is extracted among other lines to perform an accepting and deciding operation by means of the extracted line.

As described above, according to the exchange line selecting device according to the present invention, an exchange line selecting device wherein a line in a trunk group is selected within an exchange 1 that handles cells with fixed lengths has similarity deciding means 11 for deciding the similarity of a burst characteristic of an input signal, and accommodating line deciding means 12 for deciding an accommodating line in accordance with a result decided by said similarity deciding means 11. Hence, there is an advantage in that a burst traffic multiple effect can be obtained by the simplified structure, thus realizing a communication state with good efficiency.

Furthermore, in the exchange line selecting device according to the present invention, the similarity deciding means 11 includes setting burst information memory means 111 for storing setting burst information of a connection to be accommodated into a line preset on office data for each line, and the contrasting means 112 for contrasting setting burst information stored in the setting burst information memory means with user report burst information of an input signal. The accommodating line deciding means 12 includes accepting deciding means 121 for extracting a line in which said setting burst information agrees with said user report burst information in accordance with a result contrasted by said contrasting means 11 and for performing an accepting and deciding operation using said extracted line. This approach has an advantage in that the burst traffic multiple effect is obtained to realize a communication state with good efficiency.

In the exchange line selecting device according to the present invention, the accommodating line deciding means 12 has accepting and deciding means 121 for performing an accepting and deciding operation using a line with less vacant region among plural extracted lines when said plural lines are extracted. This structure realizes a communication state with good efficiency, thus avoiding an acceptance refusal state.

In the exchange line selecting device according to the present invention, the accommodating line deciding means 12 includes accepting and deciding means 121 for extracting a line among other lines, the line being reserved as a line with setting burst information resembling that of the extracted line, based on a result decided by the similarity deciding means 11 when the vacant region of the extracted line is not enough to accept a requested connection and for performing an accepting and deciding operation using the extracted line. Hence, this structure can realize a communication state with good efficiency, thus avoiding an acceptance refusal state.

Moreover, according to the exchange line selecting device of the present invention, the accommodating deciding means 12 includes accepting and deciding means 121 for extracting lines among other lines, the lines being reserved each as a line with setting burst information resembling that of the extracted line, based on a result decided by said similarity deciding means 11 when the vacant region of said extracted line is not enough to accept a requested connection and for performing an accepting and deciding operation using a line with much vacant regions among plural extracted lines. Hence, there is an advantage in that a burst traffic multiple effect can be obtained so that an acceptance refusal state can be avoided with a communication state with good efficiency realized.

According to the exchange line selecting device of the present invention, the similarity deciding means 11 includes setting burst information memory means 111A for storing setting burst information of a connection already accepted in a line, and contrasting means for contrasting the setting burst information of a connection already accepted in said line sent from the setting burst information memory means 111A with user report burst information of an input signal. The accommodating line deciding means 12 includes accepting and deciding means 121A for extracting a line in which said setting burst information agrees with said user report burst information in accordance with a result contrasted by said contrasting means 11, for extracting a line with the largest vacant band among other lines if the extracting step is not performed, and for performing an accepting and deciding operation using the extracted line. Therefore, there is an advantage in that a burst traffic multiple effect is obtained without presetting a burst type of an extracted line so that an acceptance refusal state can be avoided with a communication state with good efficiency realized.

Figure 2:
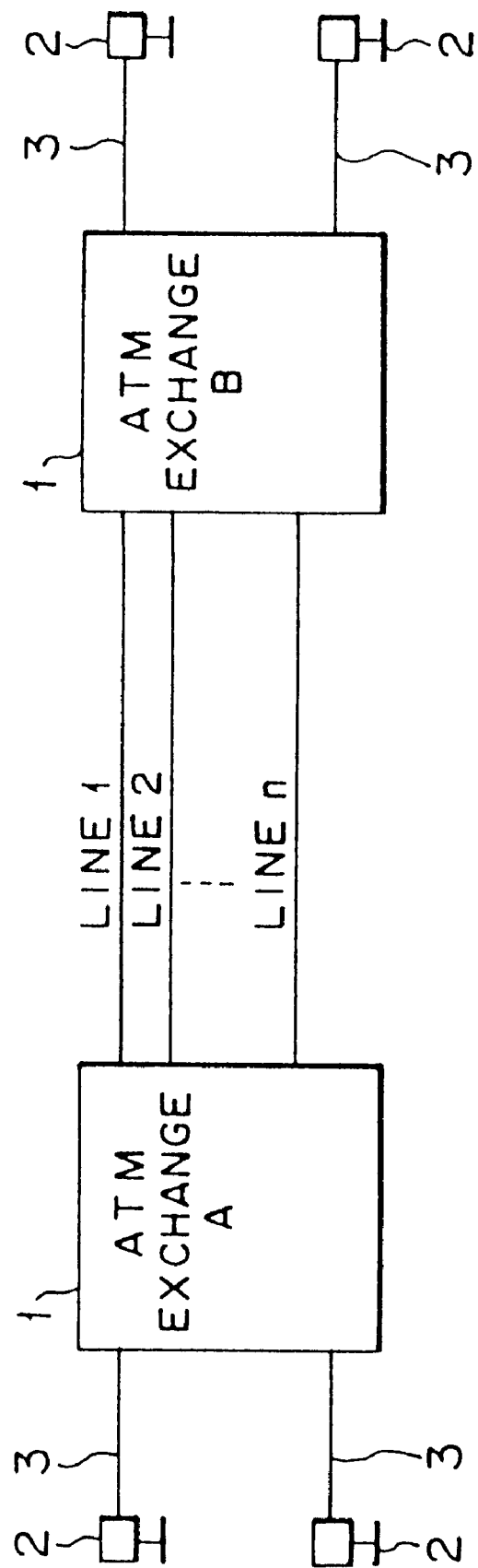
FIG. 2 is a schematic diagram showing a network embodying an exchange line selecting method and device, or the first embodiment according to the present invention.

(b) Explanation of First Embodiment:

Embodiments of the present invention will be explained with reference to attached drawings. FIG. 2 is a schematic diagram showing a network for which the present invention is applied. Referring to FIG. 2, numeral 1 represents an ATM exchange (an exchange that handles cells with fixed lengths), 2 represents an ATM terminal (hereinafter referred to a terminal), and 3 represents a subscriber line. The ATM terminal 2 is connected to the ATM exchange 1 in an office A via plural subscriber lines 3. The ATM terminal 2 is connected to the ATM exchange 1 in an office B via subscriber lines 3.

When an origination is made from the terminal 2 on the side of the office A to the office A, data transmission is performed from the terminal 2 to the ATM exchange 1. The transmitted data is forwarded to the ATM exchange 1 in the office B via any one of lines 1 to n in a trunk group, and then transmitted to one of the terminals 2.

Figure 3:
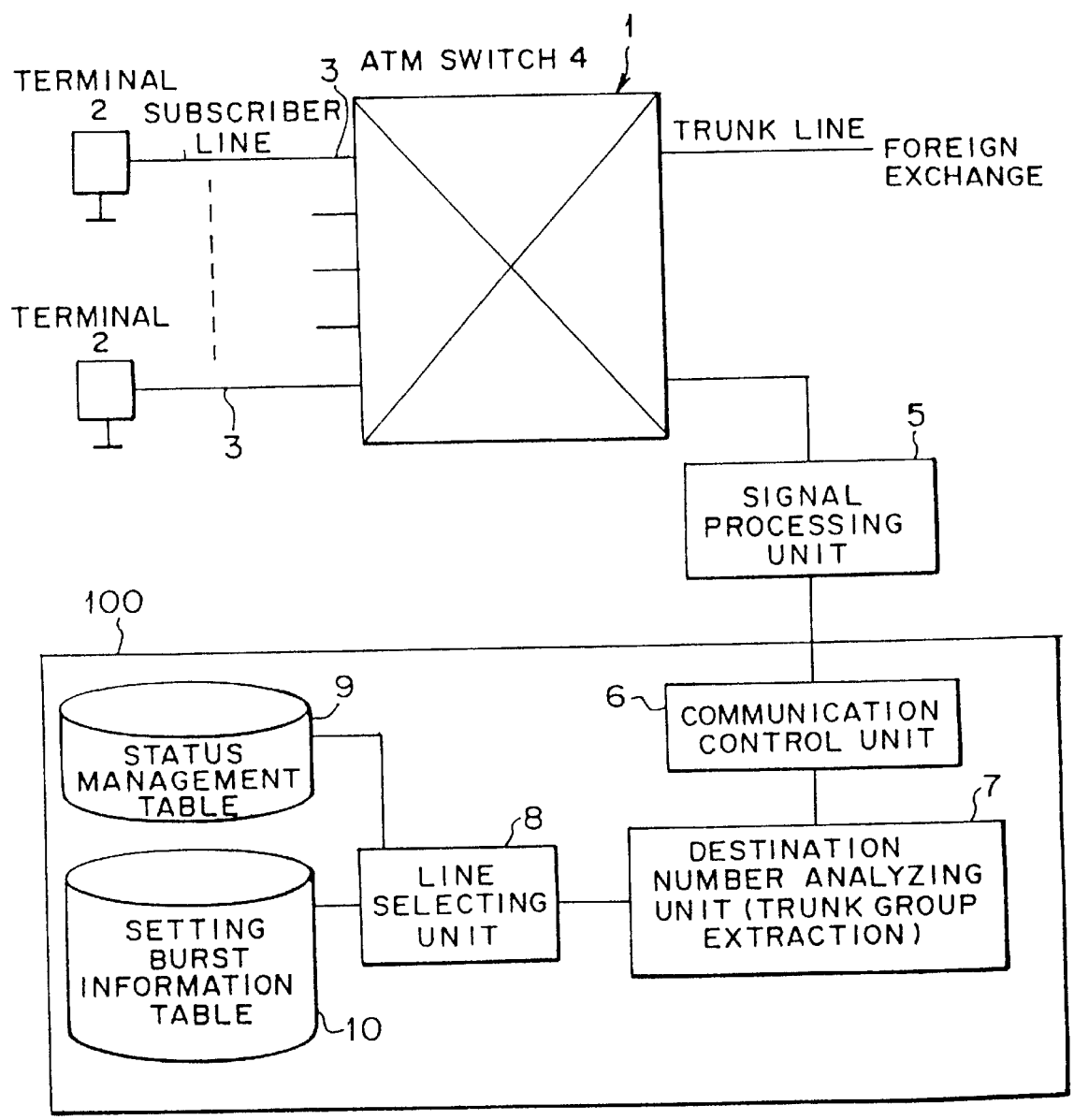
FIG. 3 is a functional block diagram showing peripheral devices for an ATM switch embodying an exchange line selecting method and device, or the first embodiment according to the present invention.

The ATM exchange 1, as shown in FIG. 3, includes an ATM exchange 4, a signal processing device 5, and a control device 100.

The ATM switch 4 is controlled by the control device 100 to perform a desired switching operation. The signal processing device 5 processes signals exchanged between the ATM switch 4 and the control device 100. The signal processing device 5 includes a signal cellulating and decellulating means.

The control device 100 executes various controls by means of the ATM switch 4. On focusing attention on the exchange line selecting function of the present invention, the control device 100 includes a communication control unit 6, a destination number analyzing unit 7, a line selecting unit 8, a status management table 9, and a setting burst information table 10.

The communication control unit 6 is an interface unit that performs a communication control via the signal processing device 5. The communication control unit 6 performs a control operation based on information extracted by cellulating and decellulating signals received by the signal processing device 5.

The destination number analyzing unit 7 detects a direction number DN of a received input and then extracts the trunk group.

The line selecting unit 8 selects a desired line corresponding to an input signal, based on setting burst information used to select a line stored in a setting burst information table 10 and data in the status management table 9 that recognizes the use status of a current line. When a line is selected, the communication control unit 6 switches the ATM switch 4 to connect a subscriber line 3 to a corresponding line, thus performing an origination to the terminal 2.

As described above, the use status of a current line is written on the status management table 9. Setting burst information of a connection to be accommodated to the corresponding line is preset as data in an office in the setting burst information table 10.

The line selecting unit 8 extracts a line in which user report burst information of an input signal agrees with setting burst information to perform an accepting and deciding operation in the extracted line.

The control device 100 includes similarity deciding means for deciding the similarity of a burst characteristic of an input signal, and accommodating line deciding means for deciding an accommodating line in accordance with a result determined by the similarity deciding means.

In this case, the similarity deciding means includes setting burst information memory means for storing setting burst information of a connection to be accommodated into a line preset on office data for each line, and contrasting means for contrasting or comparing setting burst information stored in the setting burst information memory means with user report burst information of an input signal. The accommodating line deciding means includes accepting deciding means for extracting a line in which the setting burst information agrees with the user report burst information in accordance with a result contrasted by the contrasting means and for performing an accepting and deciding operation using the extracted line.

The line selecting unit 8 functions as contrasting means and accepting and deciding means. The setting burst information table 10 has a function of the setting burst information memory means.

Figure 4:
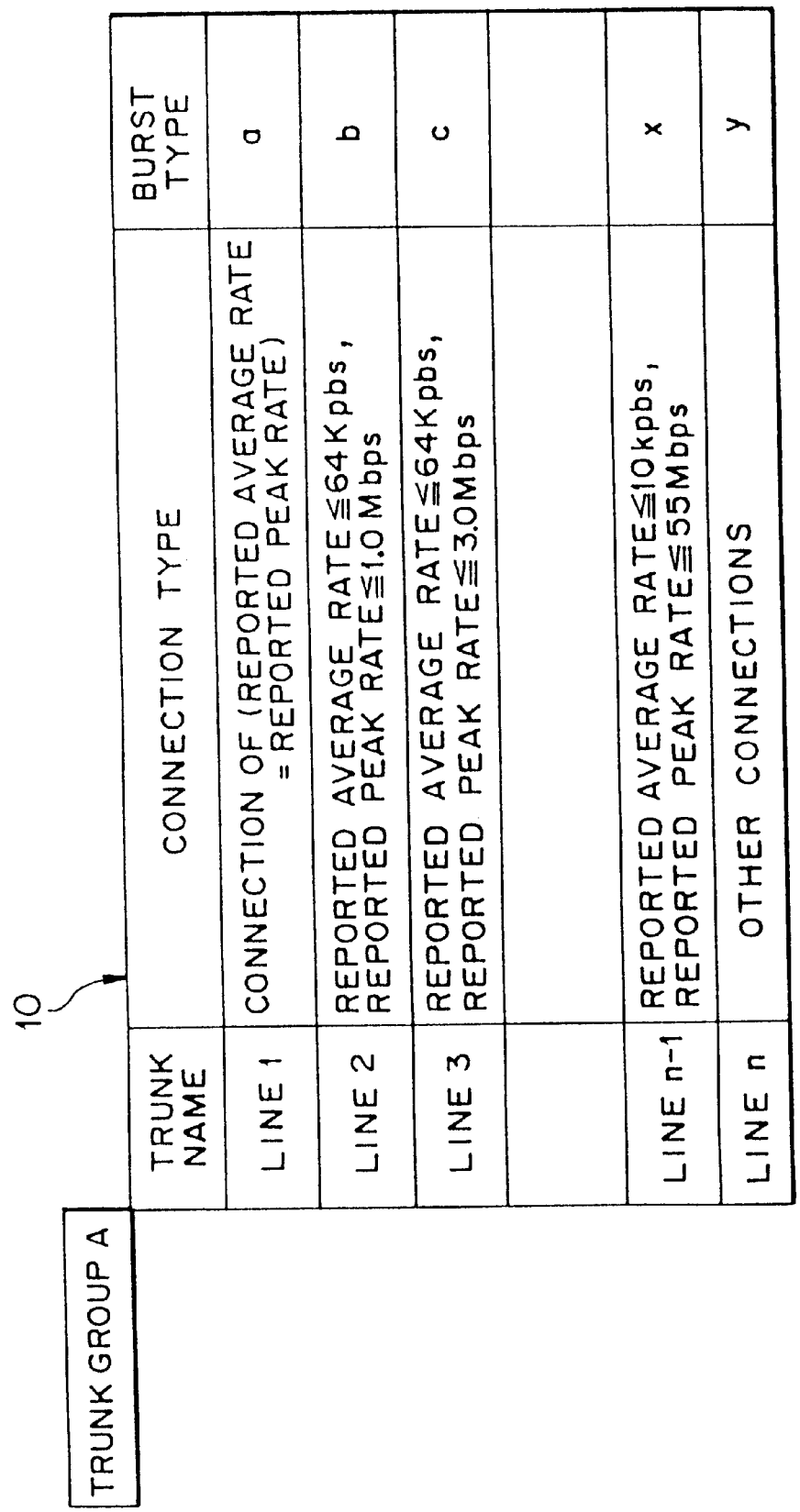
FIG. 4 is a diagram showing an example of burst setting information.

Setting burst information stored in the setting burst information table 10 is composed as shown in FIG. 4.

That is, data shown in FIG. 4 belong to the trunk group A. The burst type "a" is set to the trunk name "line 1", the burst type "b" is set to the trunk name "line 2", and the burst type "c" is set to the trunk name "line 3". In the same manner, the burst type "x" is set to the line (n−1) and the burst type "y" is set to the line n.

The connection type for the burst type "a" is set to the condition of "report average rate=report peak rate". The connection type for the burst type "b" is set to the condition of "report average rate≦64 kbps" plus "report peak rate≦1.0 Mbps".

In the same manner, the connection type for the burst type "c" is set to the condition of "report average rate≦64 kbps" plus "report peak rate≦3.0 Mbps". The connection type for the burst type "n−1" is reset to "report average rate≦10 kbps" plus "report peak rate≦55 Mbps". The connection type for the burst type "n" is set to a connection type other than connections described above.

Figure 5:
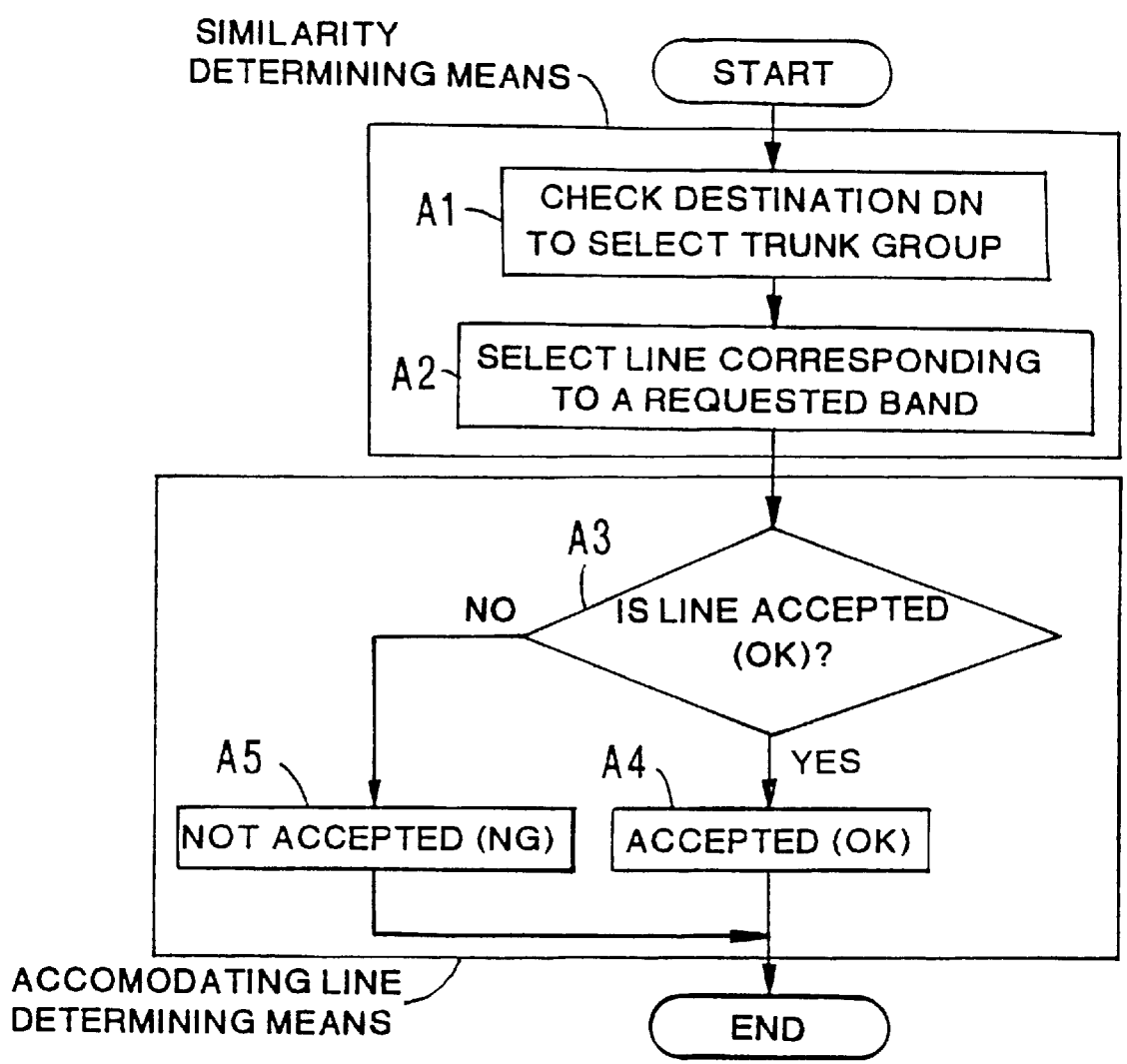
FIG. 5 is a flow chart showing an aspect of the first embodiment according to the method of the present invention.

In the structure described above, the line selecting operation is performed in accordance with the flow chart shown in FIG. 5.

First, a trunk group is selected in accordance with a result from the destination number analyzing unit 7 (step A1).

Next, both a report average rate and a report peak rate being user report burst information are referenced to contrast or compare with setting burst information in the setting burst information table 10, whereby a line corresponding to a requested band is selected (step A2). The aforementioned similarity determining means carry out steps A1 and A2.

A selected line may be used in accordance with another inputting operation. However, it is decided whether a predetermined process can accept a selected line (step A3). If it is decided that the selected line can be accepted, the accepting operation is performed (step A4). If it is decided that the selected line cannot be accepted, the accepting operation is refused (step A5). Thus, this operation terminates a sequence of process. The aforementioned accommodating line determining means execute steps A3 to A5.

Since bursts are classified and similar types of data are transmitted via the same line, a multiple effect, by which the peak and the valley of a burst traffic are canceled to each other when the span between the peaks is agreed with the span between the valleys, can be positively obtained, thus realizing a communication state with good efficiency.

Figure 6:
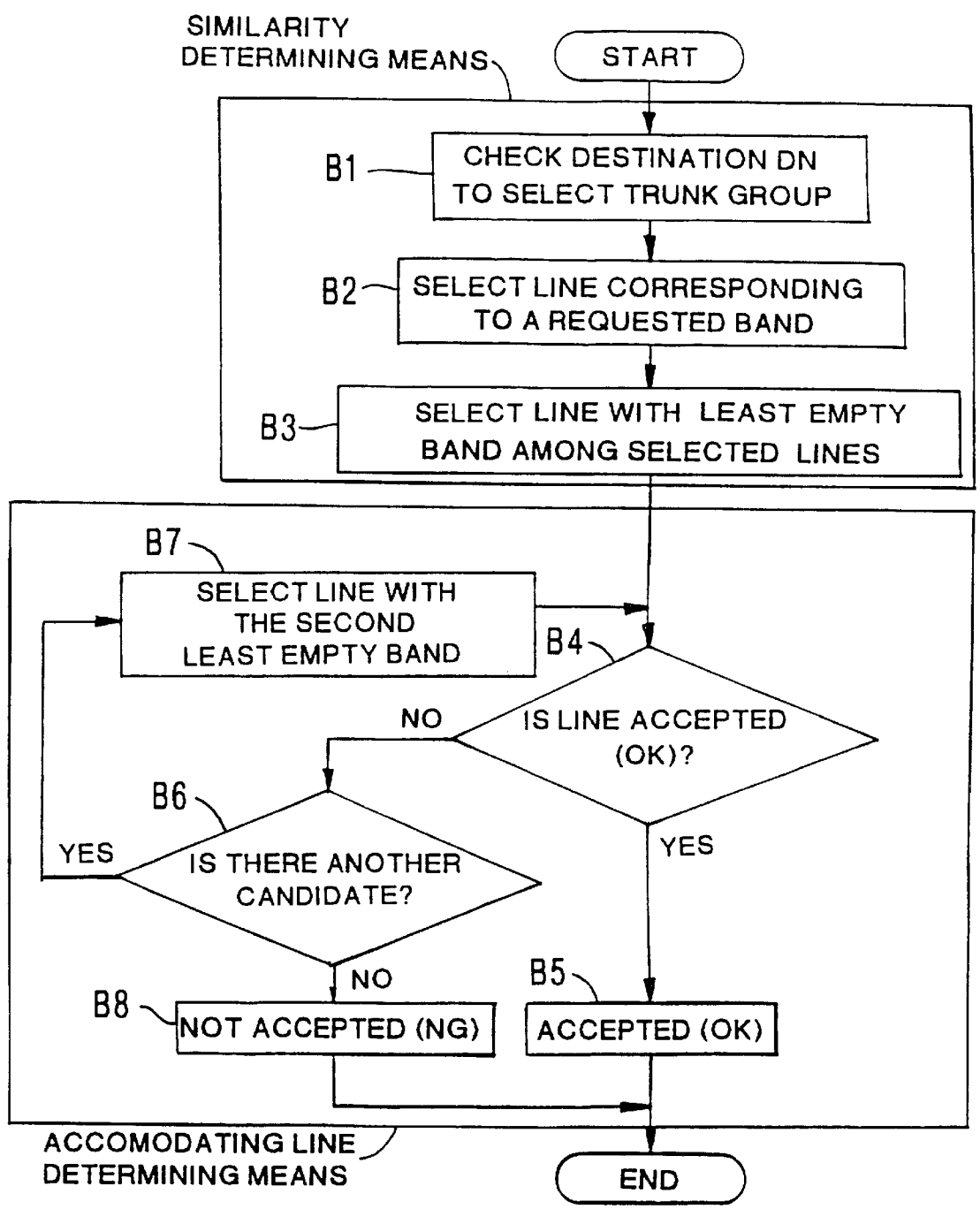
FIG. 6 is a flow chart showing an aspect of the second embodiment according to the method of the present invention.

Moreover, the following process is performed in the present embodiment. In this case, a process follows the flow chart shown in FIG. 6 when an accepting operation is not performed in the step A5 shown in FIG. 5. FIG. 6 also shows which functions are assigned to the similarity determining means and the accommodating line determining means.

A trunk group is selected based on a result analyzed in the destination direction analyzing unit 7 (step B1).

Then, both a report average rate and a report peak rate, each being user report burst information, are referenced to contrast the setting burst information in the user report burst table 10 so that plural lines that correspond to requested bands are selected (step B2).

Thereafter, a line with the least vacant band is selected from the selected lines (step B3).

The selected line may be used in response to another input operation. However, if a predetermined process performs an accepting and deciding operation (step B4). If an acceptance operation is enabled (step B5), data is transmitted by way of the accepted line.

On the other hand, if an acceptance decision is disabled to a selected line, the flow goes to "NO" route in the step B4 to decide whether there is the next candidate (step B6).

If there is a candidate, the flow goes to "YES" route to select a line with the least vacant band in the second place (step B7) so that an acceptance decision is performed again in the step B4.

This operation is repeated as long as there is a candidate. If the candidate runs out, the flow goes to "NO" route in the step B6 to terminate the acceptance process NG (step B8).

That is, if plural lines are extracted, the line selecting unit 8 functions contrasting means and accommodating deciding means performs an acceptance and deciding operation using a line with less vacant bands among plural extracted lines.

Hence, the line selecting method described above provides the burst traffic multiple effect, thus realizing communication state with good efficiency while the acceptance refusal state can be avoided.

Furthermore, in the present embodiment, the following process is performed. In this case, a priority burst type, as shown in FIG. 7, is arranged in the setting burst information table 10. The operation is performed by the similarity determining or comparing means and the accommodating line determining or deciding means along the flow chart shown in FIG. 8.

First, a trunk line is selected based on a result analyzed by the destination number analyzing unit 7 (step C1).

Next, the report average rate and the report peak rate as user report burst information are referenced to contrast the setting burst information in the setting burst information table 10. As a result, plural lines corresponding to a requested band are selected (step C2).

Thereafter, a line with the least vacant region is selected among the selected lines (step C3).

The selected line may be used in response to another inputting operation. However, a predetermined process performs an accepting and deciding operation (step C4). If an acceptance is receivable, an acceptance operation is performed (step C5) to transmit data via the accepted line.

On the other hand, an acceptance decision to a selected line shows a disabled acceptance, the flow goes to "NO" route in the step C4 to decide whether there are vacant lines among lines with the same burst attribute (step C6).

If there is a vacant line, the flow goes to "YES" route to execute an acceptance and decision process to the next candidate (step C7).

On the other hand, if it is decided that there are no lines in the step C6, the step C2 is executed, it is decided whether there is a line of another burst attribute in accordance with the selecting order (priority order) shown in FIG. 7.

That is, data regarding the priority order is constituted as shown in FIG. 7.

As for the connection request burst type a, the burst type b is set first to be the next candidate. In the same manner, the connection request burst types are set in the order of c, d, e, f, g, h, . . . , and y.

As for the connection request burst type b, the burst type c is set first to be the next candidate. In the same manner, the connection request burst types are set in the order of d, e, f, g, h, . . . , and y.

Moreover, as for the connection request burst type b, the burst type is set in a decreasing order from e. In the same manner, the order of each connection request burst type is set.

In step C9, other burst attribute lines are selected in accordance with the orders set as mentioned above.

Therefore, if there is a candidate corresponding to a priority order, a line with a vacant region less in the next place is selected via the "YES" route (step C9) to execute again an acceptance and decision operation in the step C4. Such an operation is repeated as long as there is a candidate. If there is no candidate, the flow goes to "NO" route in the step C8 to terminate the acceptance process NG (step C10).

In this case, if plural lines are extracted, the line selecting unit 8 that functions as contrasting means and accommodating line deciding means functions as accepting and deciding means that performs an acceptance decision operation with a less vacant region among plural extracted lines. If the vacant region of an extracted line is not enough to accept a request connection, the line selecting unit 8 functions as accepting and deciding means that extracts a line among other lines, the line being reserved as a line with setting burst information resembling that of the extracted line, based on a result decided by the similarity deciding means to perform an acceptance and decision operation with a less vacant region among plural extracted lines.

Hence, the use of the line selecting method provides the burst traffic multiple effect, thus realizing the communication state with good efficiency while an acceptance refusal state can be avoided.

Figure 9:
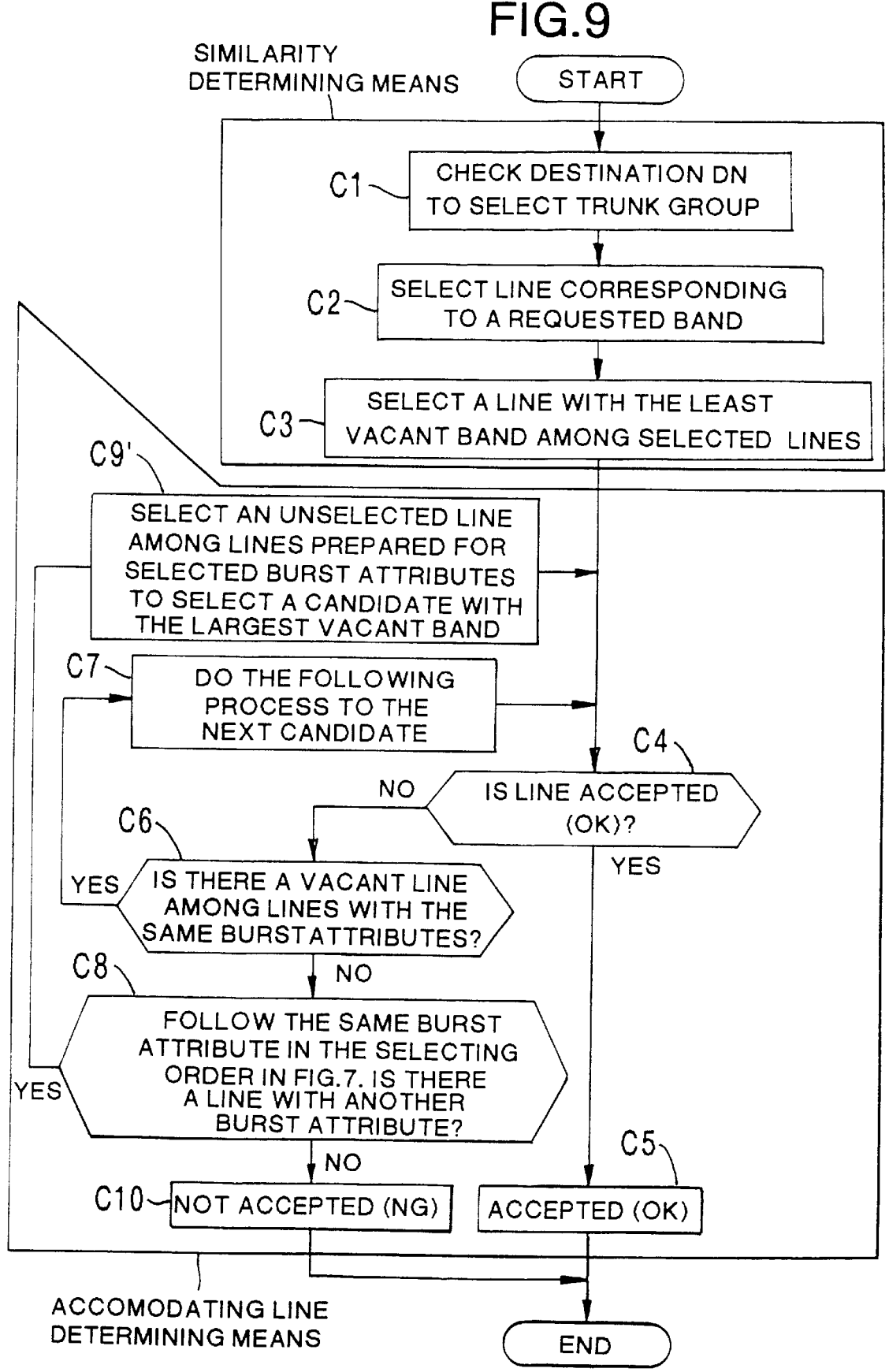
FIG. 9 is a flow chart showing an aspect of the fourth embodiment according to the method of the present invention.

The following process can be performed according to the present embodiment. In this case, the same type of line selecting means can be provided in addition to a selection of the priority burst type shown in FIG. 9.

Figure 8:
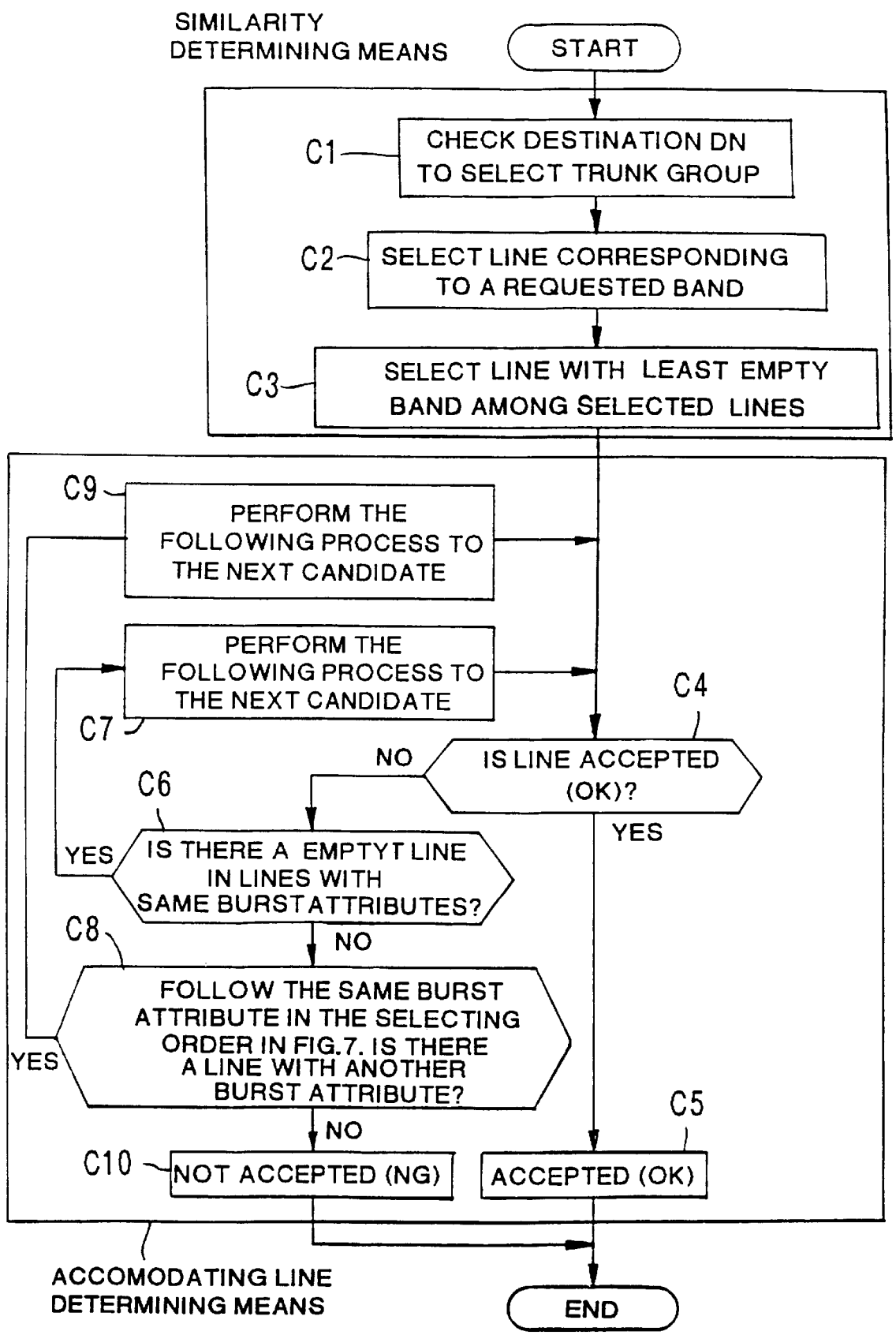
FIG. 8 is a flow chart showing an aspect of the third embodiment according to the method of the present invention.

That is, the operations in the steps C1 to C8 and C10 are performed in the same manner as that shown in FIG. 8.

In the step C8, when the flow goes to "YES" route to select a line with another burst attribute, the step C9' is executed to select a line under no selection among lines prepared for the selected burst attribute. Thus, a line with the largest (most) vacant band is selected as a candidate.

For example, if the lines 1 to 3 are allocated for the burst attribute a selected by the priority burst type, a line with the largest vacant band is decided among the lines 1 to 3 (step 9'). An acceptance decision is performed to the decided line (step C4).

In this case, when the vacant region of an extracted line is not enough to accept a requested connection, the line selecting unit 8, which has contrasting means and the accommodating line deciding means, functions as accepting and deciding means that extracts lines among other lines, the lines being reserved each as a line with setting burst information most resembling that of the extracted line, based on a result decided by the similarity deciding means to perform an acceptance and decision operation using a line with the most vacant region among plural extracted lines.

Hence, the use of the line selecting method provides the burst traffic multiple effect, thus realizing a communication state with good efficiency while an acceptance refusal state can be avoided.

Figure 10:
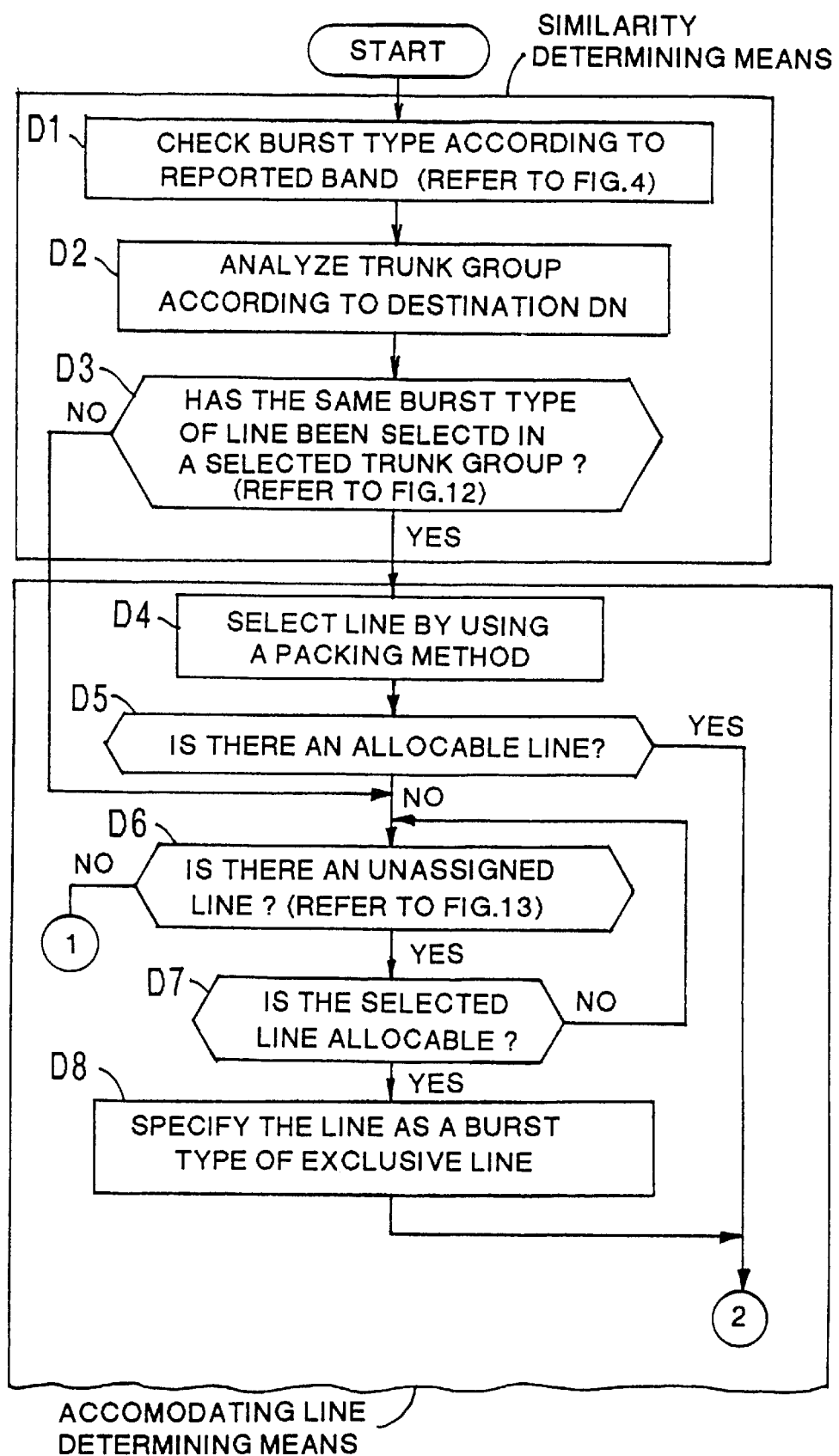
FIG. 10 is a flow chart showing an aspect of the fifth embodiment according to the method of the present invention.
Figure 11:
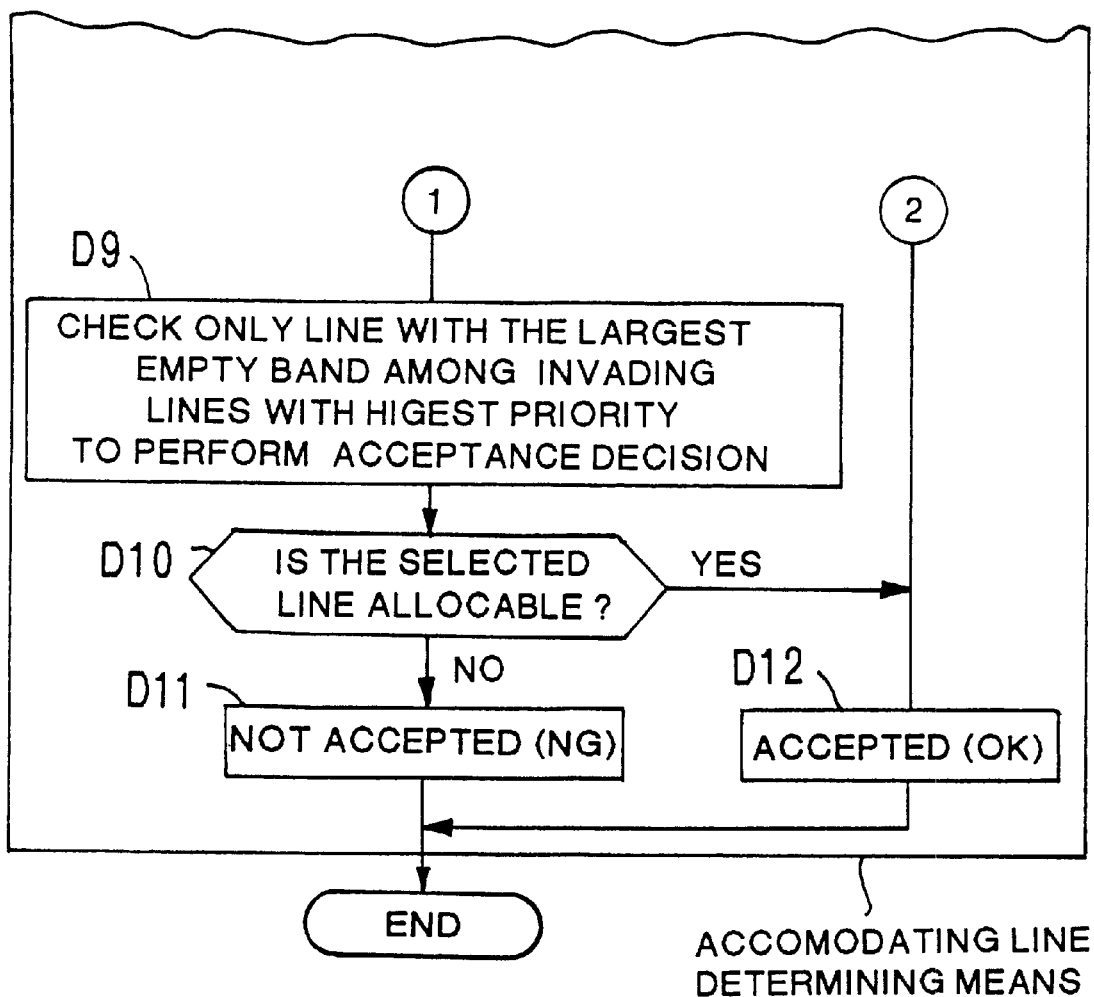
FIG. 11 is a flow chart showing an aspect of the fifth embodiment according to the method of the present invention.

According to the present embodiment, the following can be processed. That is, in this case, an operation is performed by the similarity determining or deciding means and the accommodating line determining or deciding means in accordance with the flow charts shown in FIGS. 10 and 11.

First, in reception of the setting burst information shown in FIG. 4, a type of burst is checked based on the report band of an input signal to specify the type of data burst (step D1).

Next, the destination number analyzing unit 7 analyzes the destination number DN to recognize the same (step D2).

It is decided whether a line for the same type of burst has been already selected in a selected trunk group (step D3).

This operation is different from that in each of the foregoing embodiments.

Namely, in the embodiments, types of burst are preallocated for lines, respectively. However, in the present embodiment, types of burst are not allocated, but decided by a previous private history. The line already occupied is set as a line of the burst type for data used by the line.

Figure 12:
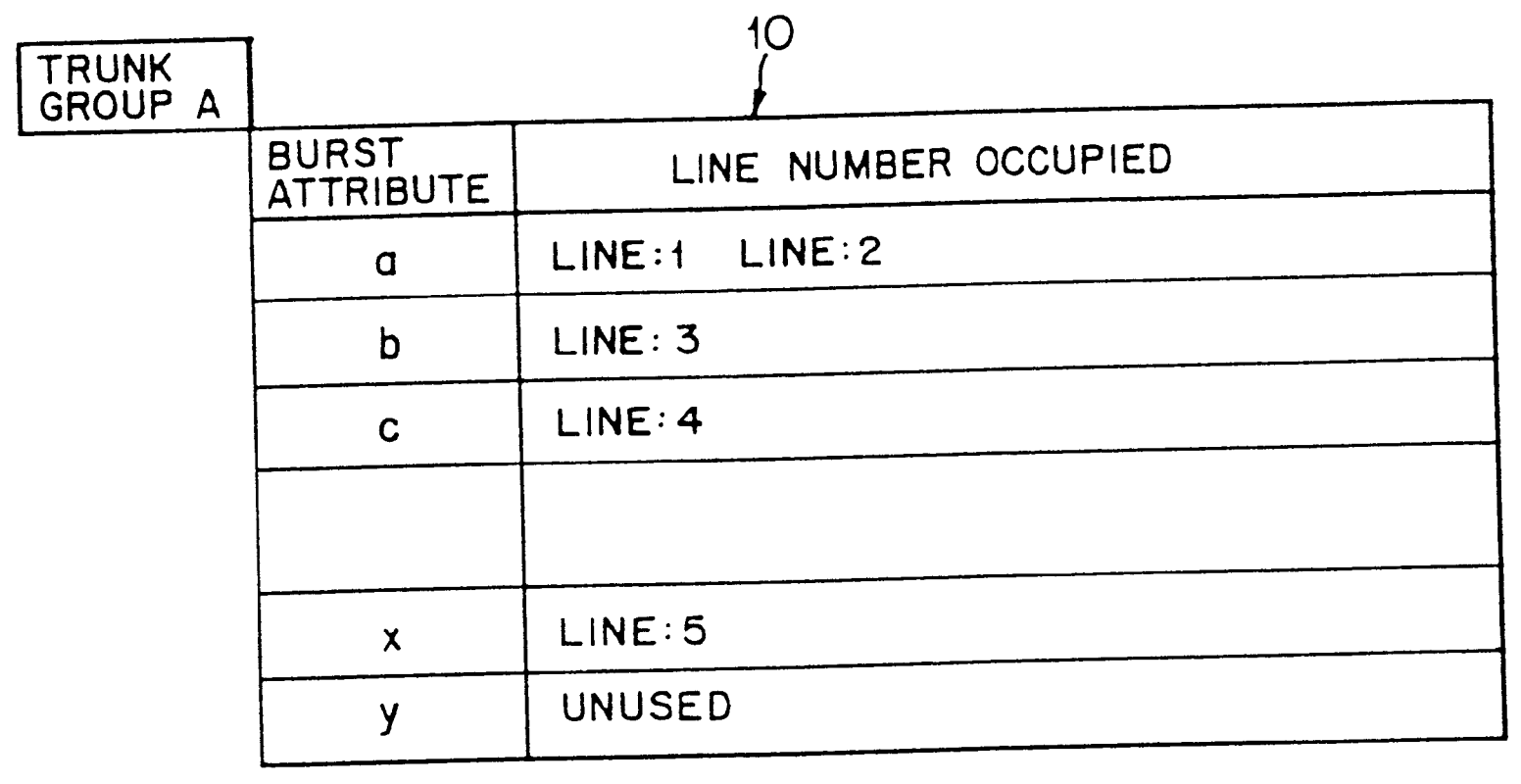

Hence, a signal of a burst attribute a, as shown with data in FIG. 12, is inputted to, for example, the lines 1 and 2. Both lines are set as a line of a data burst attribute a at this time.

A line not used is set as a line of a burst attribute y.

In the step D3, when the decision on whether the same burst-type line has been selected in a selected trunk group is "YES", the step D4 is performed via "YES" route to select a line in the squeezing system. That is, a line with the least (smallest) vacant region is selected among the burst types of lines.

For example, since the burst type of an input signal is a in the data shown in FIG. 12, a line with less vacant region is selected from the lines 1 and 2.

At the same time, it is judged whether there is an allocable line. If there is an allocable line, an accepting operation is performed via "YES" route (step D5).

If there is no line that can be allocated, the step D6 is performed via "NO" route to decide whether there is an unassigned line (step D6).

When an unassigned line is selected, it is decided whether a selected line can be allocated (step D7). If possible, the line is set as an exclusive line of a type of burst (step D8). Then, an acceptance process can be performed (step D12).

For example, lines 6 and 7 are unassigned in the status management table 9 shown in FIG. 13. A signal of a new type of burst is inputted to the line 6 or 7 to set to the type of burst.

When the "NO" route, or no unassigned lines, is selected in the step D6, the step D9 is performed to check only a line with the largest vacant region selected from the interrupt line with the highest priority, thus performing an acceptance decision.

It is decided whether a selected line can be allocated (step D10). If possible, the step D12 is performed via "YES" route to perform an acceptance process.

If the allocation cannot be performed, the step D12 is not accepted via the "NO" route so that an acceptance process is refused (step D11).

A sequence of operations are performed as described above. An embodiment will be explained in accordance with data shown in FIGS. 14 to 16.

First, let us assume that the state shown in FIG. 14 is first at an operational start.

That is, the lines 1 to 4 are being used. The lines 1 and 2 are set to a burst type a, the line 3 is set to a burst type b, and the line 4 is set to a burst type c.

The service condition is ascertained with data in the status management table 9 shown in FIG. 15. When there is a connection request of a burst type a since all lines in the trunk group A are being used, a line with the largest vacant region among similar burst type b, or the line 3, is selected (in this case, the line 3 with the largest vacant band), as shown in FIG. 15.

The line 3 belongs to the burst type a. That is, the control device 100 functions as similarity deciding means and accommodating line deciding means; the similarity deciding means including burst information memory means for storing burst information of a connection already accepted in a line, and contrasting means for contrasting the burst information of a connection already accepted in the line sent from the burst information memory means with user report burst information of an input signal; the accommodating line deciding means including accepting deciding means for extracting a line in which the burst information agrees with the user report burst information in accordance with a result contrasted by the contrasting means and for performing an accepting and deciding operation using the extracted line.

The line selecting unit 8 functions as contrasting means and accepting and deciding means. The setting burst information table 10 functions as the setting burst information memory means.

Hence, the use of the line selecting method can provide the burst traffic multiple effect without presetting a burst type, whereby an acceptance refusal state can be avoided with a communication state with good efficiency.

What is claimed is:

1. An exchange line selecting method performed by an exchange selecting device and comprising the steps of:

comparing user report traffic information in an input signal of a requested call with managing traffic information previously assigned to each candidate line when a candidate line is selected, said candidate line being within an exchange that handles cells with fixed lengths;

deciding at least one candidate line as an accommodating line for the requested call in which said managing traffic information approximates said user report traffic information based on result of said comparing step;

selecting among a plurality of candidate lines a line reserved as a line with said managing traffic information closely approximating that of said accommodating line, when available bandwidth of said accommodating line is not sufficient to accept a requested call; and performing the requested call accepting and deciding operation using said selected reserved line.

2. The exchange line selecting method according to claim 1, wherein said comparing step includes:
contrasting said user report traffic information of said input signal of said requested call with said managing traffic information that is preset in accordance with office data of each candidate line, said managing traffic information relating to a connection to be accommodated in a candidate line; and said deciding step includes:
selecting at least one candidate line on which said managing traffic information approximates said user report traffic information; and
performing a requested call accepting and deciding operation with the accommodating line.

3. The exchange line selecting method according to claim 2, further comprising the step of:

performing the requested call accepting and deciding operation using a candidate line with least available bandwidth among a plurality of selected lines if a plurality of candidate lines are selected.

4. An exchange line selecting method performed by an exchange selecting device and comprising the steps of:

comparing user report traffic information in an input signal of a requested call with managing traffic information previously assigned to each candidate line when a candidate line is selected, said candidate line being within an exchange that handles cells with fixed lengths;

deciding at least one candidate line as an accommodating line for the requested call in which said managing traffic information approximates said user report traffic information based on a result of said comparing step; and wherein said comparing step includes:
contrasting said user report traffic information of said input signal of said requested call with said managing traffic information that is preset in accordance with office data of each candidate line, said managing traffic information relating to a connection to be accommodated in a candidate line; and said deciding step includes:
  selecting at least one candidate line on which said managing traffic information approximates said user report traffic information;
  performing a requested call accepting and deciding operation with the selected line; and
  selecting among a plurality of candidate lines a line reserved as a line with said managing traffic information most closely approximating that of said accommodating line, when available bandwidth of said accommodating line is not sufficient to accept a requested call; and
  performing the requested call accepting and deciding operation using said selected reserved line.

5. An exchange line selecting method performed by an exchange selecting device and comprising the steps of:
  comparing user report traffic information in an input signal of a requested call with managing traffic information previously assigned to each candidate line when a candidate line is selected, said candidate line being within an exchange that handles cells with fixed lengths;
  deciding at least one candidate line as an accommodating line for the requested call in which said managing traffic information approximates said user report traffic information based on a result of said comparing step; and
  wherein said comparing step includes:
    contrasting said user report traffic information of said input signal of said requested call with said managing traffic information that is preset in accordance with office data of each candidate line, said managing traffic information relating to a connection to be accommodated in a candidate line; and
  said deciding step includes:
    selecting at least one candidate line on which said managing traffic information approximates said user report traffic information;
    performing a requested call accepting and deciding operation with the selected line; and
    selecting among a plurality of candidate lines a number of lines reserved each as a line with managing traffic information approximating that of said accommodating line, when available bandwidth of said accommodating line is not sufficient to accept a requested call; and
  performing a requested call accepting and deciding operation using a line with a greatest available bandwidth among said number of selected reserved lines.

6. The exchange line selecting method according to claim 1,
  wherein said comparing step includes:
    step for comparing said user report traffic information of said input signal of the requested call with managing traffic information of a connection already accepted in a candidate line;
  and said deciding step includes:
    first selecting step for selecting a candidate line in which said managing traffic information approximates said user report traffic information;
    second selecting step for selecting a candidate line with the largest available bandwidth among candidate lines if said first selecting step is not performed; and
    step for performing a request call accepting and deciding operation with the selected line.

7. An exchange line selecting device wherein a line is selected within an exchange that handles cells with fixed lengths, the device comprising:
  managing means including a setting burst information table containing setting burst information for managing traffic information of a connection to be accommodated into each line;
  comparing means for comparing user report traffic information of an input signal of a requested call with said managing traffic information managed by said managing means; and
  accommodating line deciding means for deciding at least one candidate line as an accommodating line for the requested call in which said managing traffic information approximates said user report traffic information based on a result determined by said comparing means;
  wherein said accommodating line deciding means includes a requested call accepting and deciding means for selecting from a plurality of lines a line reserved as a line with managing traffic information closely approximating that of the selected line, based on a result determined by said comparing means, when the available bandwidth of said selected line is not sufficient to accept the requested call and for performing a requested call accepting and deciding operation using said selected reserved line.

8. The exchange line selecting device according to claim 7, wherein said user report traffic information of an input signal of the requested call is a user report traffic rate parameter; and wherein said accommodating line deciding means includes a requested call accepting and deciding means for selecting at least one line in which a managing traffic rate parameter of said managing traffic information approximates a user report traffic rate parameter in accordance with a result obtained by said comparing means and for performing a request call accepting and deciding operation using said accommodating line.

9. The exchange line selecting device according to claim 8, wherein said accommodating line deciding means includes second accepting and deciding means for performing a request call accepting and deciding operation using a candidate line with least available bandwidth among a plurality of selected lines when a plurality of candidate lines are selected.

10. An exchange line selecting device wherein a line is selected within an exchange that handles cells with fixed lengths, the device comprising:
  managing means including a setting burst information table containing setting burst information for managing traffic information of a connection to be accommodated into each line;
  comparing means for comparing user report traffic information of an input signal of a requested call with said managing traffic information managed by said managing means; and
  accommodating line deciding means for deciding at least one candidate line as an accommodating line for the requested call in which said managing traffic information approximates said user report traffic information based on a result determined by said comparing means; and
  wherein said user report traffic information of an input signal of the requested call is a user report traffic rate parameter; and wherein said accommodating line deciding means includes a requested call accepting and deciding means for selecting at least one line in which a managing traffic rate parameter of said managing traffic information approximates a user report traffic rate parameter in accordance with a result obtained by said comparing means and for performing a request call accepting and deciding operation using said selected line; and wherein said accommodating line deciding means includes a requested call accepting and deciding means for selecting from a plurality of lines a line reserved as a line with managing traffic information most closely approximating that of the selected line, based on a result determined by said comparing means, when the available bandwidth of said selected line is not sufficient to accept the requested call and for performing a requested call accepting and deciding operation using said selected reserved line.

11. An exchange line selecting device wherein a line is selected within an exchange that handles cells with fixed lengths, the device comprising:

managing means including a setting burst information table containing setting burst information for managing traffic information of a connection to be accommodated into each line;

comparing means for comparing user report traffic information of an input signal of a requested call with said managing traffic information managed by said managing means; and accommodating line deciding means for deciding at least one candidate line as an accommodating line for the requested call in which said managing traffic information approximates said user report traffic information based on a result determined by said comparing means; and wherein said user report traffic information of an input signal of the requested call is a user report traffic rate parameter; and wherein said accommodating line deciding means includes a requested call accepting and deciding means for selecting at least one line in which a managing traffic rate parameter of said managing traffic information approximates a user report traffic rate parameter in accordance with a result obtained by said comparing means and for performing a request call accepting and deciding operation using said selected line; and wherein said accommodating deciding means includes a requested call accepting and deciding means for selecting from a plurality of lines a number of lines reserved each as a line with managing traffic information most closely approximating that of the selected line, based on a result determined by said comparing means, when the available bandwidth of said selected line is not sufficient to accept the requested call and for performing a requested call accepting and deciding operation using a line with greatest available bandwidth among said number of selected lines.

12. The exchange line selecting device according to claim 7, wherein said comparing means includes managing traffic information memory means for storing managing traffic information of a connection already accepted in a line, and comparing means for comparing said managing traffic information of a connection already accepted in said line sent from said managing traffic information memory means with said user report traffic information of an input signal of the requested call, and wherein said accommodating line deciding means includes first selecting means for selecting a line in which said managing traffic information appropriates said user report traffic information of an input signal of the requested call in accordance with a result obtained by said comparing means, second selecting means for selecting a line with the largest available bandwidth among other lines if said selecting by said first selecting means is not performed, and means for performing the requested call accepting and deciding operation using said selected line.

* * * * *